United States Patent [19]

Rinaldo et al.

[11] 4,331,185
[45] May 25, 1982

[54] TRANSMISSION FILLER ASSEMBLY

[75] Inventors: James D. Rinaldo, Joliet, Ill.; Robert M. Vize, Bettendorf, Iowa

[73] Assignee: Caterpillar Tractor Co., Peoria, Ill.

[21] Appl. No.: 262,069

[22] PCT Filed: Jul. 14, 1980

[86] PCT No.: PCT/US80/00882

§ 371 Date: Jul. 14, 1980

§ 102(e) Date: Jul. 14, 1980

[87] PCT Pub. No.: WO82/00277

PCT Pub. Date: Feb. 4, 1982

[51] Int. Cl.³ .............................................. B65B 3/04
[52] U.S. Cl. ..................................... 141/95; 141/285;
141/326; 33/126.7 R; 74/606 R; 184/1.5;
184/105 R; 220/86 R
[58] Field of Search ........... 33/126, 126.7 R, 126.7 A,
33/126.4; 141/1, 94, 95, 96, 326, 325, 327, 392,
285, 348; 138/109; 220/86 R; 137/588; 74/606
R; 184/1.5, 105 R; 123/196 R

[56] References Cited

U.S. PATENT DOCUMENTS

| | | | |
|---|---|---|---|
| 1,520,230 | 12/1924 | Flath | 33/126.7 R |
| 2,138,104 | 11/1938 | Kellogg | |
| 2,757,647 | 8/1956 | Kishline | 33/126.7 R |
| 2,953,939 | 9/1960 | Rains | 33/126.7 R |
| 3,838,713 | 10/1974 | Tubbs | 138/109 |
| 3,913,639 | 10/1975 | Davis | 141/285 |
| 3,942,564 | 3/1976 | Chigasaki | 141/348 |
| 4,067,113 | 1/1978 | Haines et al. | 33/126.7 R |
| 4,266,344 | 5/1981 | Richardson | 33/126.7 R |
| 4,276,694 | 7/1981 | Richardson | 33/126.7 R |

Primary Examiner—Houston S. Bell, Jr.
Attorney, Agent, or Firm—Phillips, Moore, Weissenberger, Lempio & Majestic

[57] ABSTRACT

Service personnel may confuse one dip stick for another in vehicles having a number of fluid reservoirs. When the reservoirs have air entrapped within them during filling, hydraulic lock can occur. Herein, a filler tube structure (20) and a dip stick tube structure (30) have their top ends held within a tubular fitting (40) which is covered by a single cap (58). This eliminates any possible confusion as to the dip stick tube structure (30) which corresponds to a particular reservoir or chamber (12). In the preferred embodiment venting of the chamber (12) to which the fluid is being added is provided via an interior passage (32) of the dip stick tube structure (30), thus preventing hydraulic lock.

7 Claims, 4 Drawing Figures

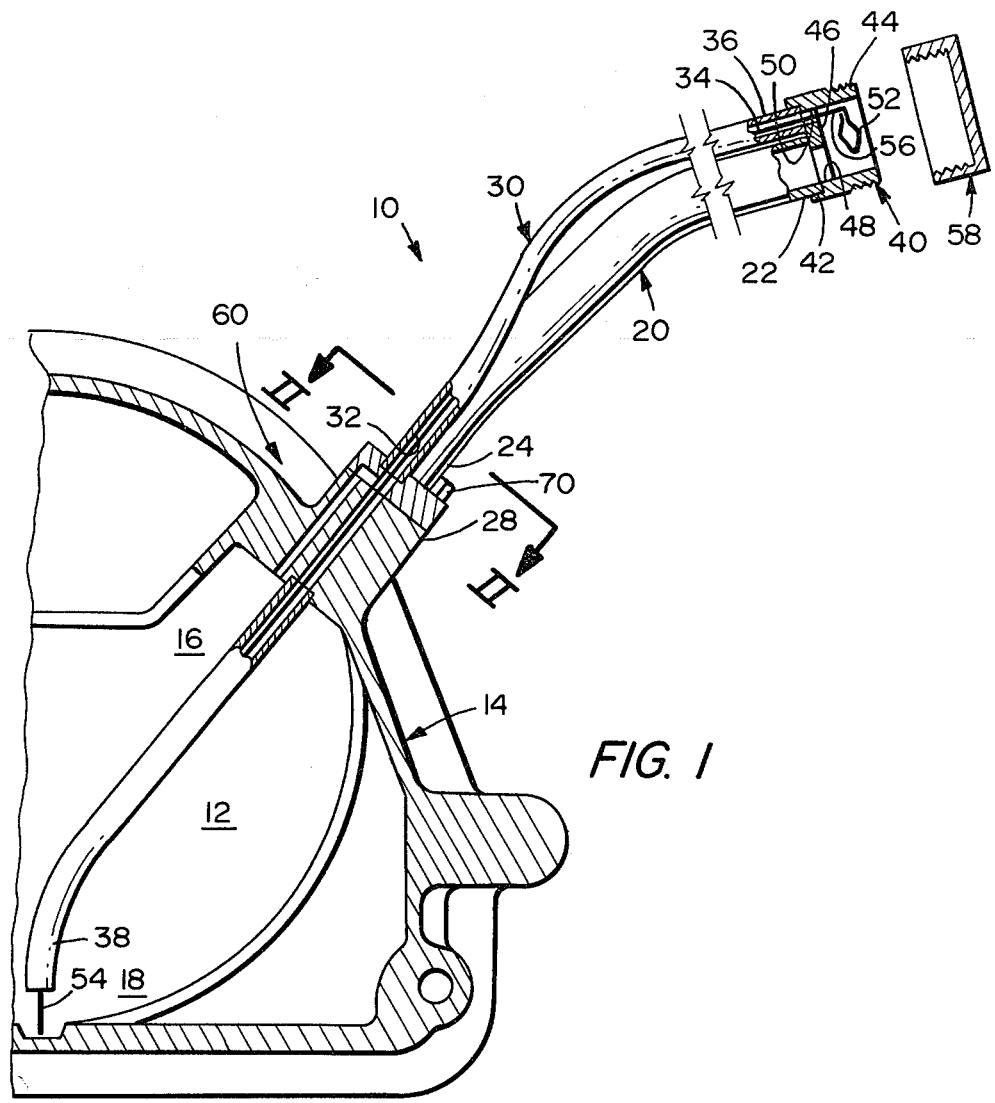
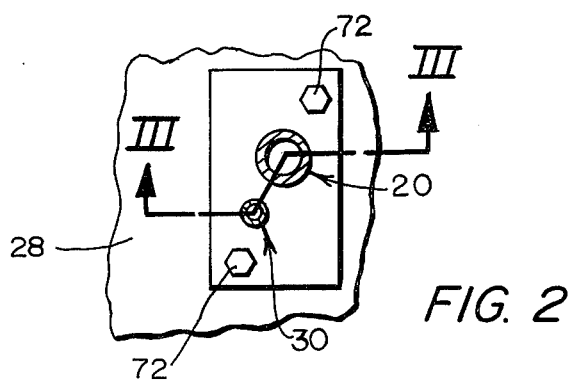
FIG. 1
FIG. 2

TRANSMISSION FILLER ASSEMBLY

DESCRIPTION

1. Technical Field

This invention relates generally to an assembly for filling a closed interior chamber and more particularly to an assembly for filling a transmission with a liquid lubricant.

2. Background Art

On earthworking equipment and other vehicles there are often several chambers which must be periodically filled with fluid to a desired level. For example, one chamber may hold engine lubricating oil, another may hold transmission fluid, still another may hold brake fluid, etc. To determine when a particular chamber must have fluid added, it is customary and convenient to utilize a dip stick.

Since there are several chambers which may need filling, there must be a corresponding number of dip sticks. This creates a problem for service personnel of determining which dip stick corresponds to each chamber. Normally, the dip sticks and fluid addition ports are correspondingly labelled. However, such labelling can become obscured due to dirt and/or wear. Hence, labelling alone is not an adequate solution to the problem.

While it is well known to vent chambers such as gasoline tanks and water tanks when they are being filled, an adequate assembly has not been available for accomplishing this with a closed pressure system such as a transmission, particularly through utilizing the filler assembly for this purpose upon disengaging its cap. Yet, it is particularly important to assure that an adequate air vent is present in such a system to normalize transmission pressure since hydraulic lock could occur, particularly when oil viscosity is relatively high as during cold weather, if proper venting has not taken place.

The present invention is directed to overcoming one or more of the problems as set forth above.

DISCLOSURE OF THE INVENTION

In one aspect of the present invention an assembly is provided for adding oil to a closed interior chamber defined by a case. A filler tube structure having input and exit portions has the exit portion thereof in communication with a top portion of the chamber. A dip stick guide tube structure has an interior passage in which a dip stick normally fits. The upper end portion of the guide tube structure is positioned adjacent and generally parallel to the input portion of the filler tube structure. A tubular fitting is provided which has first and second end portions with the first end portion being circumferentially sealed to the upper portion of the guide tube structure and to the input portion of the filler tube structure. The cap is removably attachable in covering relation with the second end portion of the tubular fitting.

When an assembly as set out above is utilized, it is virtually impossible for even an untrained person to utilize the wrong dip stick to determine the lubricant level within a particular system such as a transmission. Also, when the preferred embodiment of the invention is utilized, the occurrence of hydraulic lock when filling the interior chamber is reduced.

BRIEF DESCRIPTION OF THE DRAWINGS

FIG. 1 illustrates, in side partial view, partially in section, an embodiment of the present invention;

FIG. 2 illustrates a partial view taken along the line II—II of FIG. 1;

BEST MODE FOR CARRYING OUT THE INVENTION

Figure 3:
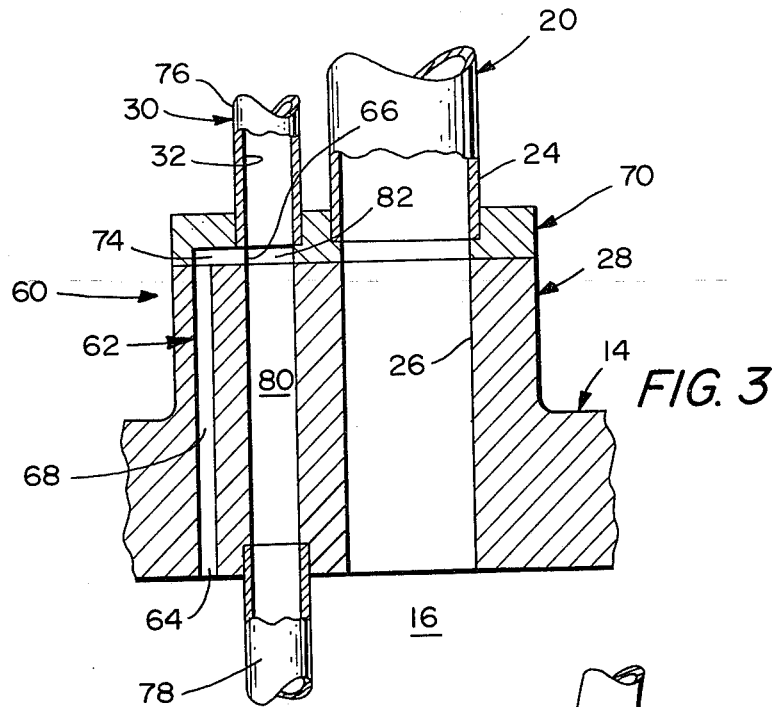
FIG. 3 illustrates a view taken along the line III—III of FIG. 2, somewhat enlarged.

Embodiment of FIGS. 1-3

FIG. 1 shows an assembly 10 for adding a liquid to a closed interior chamber 12 defined by a case 14. The chamber 12 has a top portion 16 and a bottom portion 18. The case 14 would be the case for a transmission (not illustrated), in accordance with the preferred embodiment of the invention. However, it should be realized that the invention is not limited to an assembly 10 for filling only a transmission.

A filler tube structure 20 has an input portion 22 and an exit portion 24. The exit portion 24 is in communication with the top portion 16 of the chamber 12. The input portion 22 is generally above the exit portion 24 so as to provide gravity driven flow. Adverting temporarily to FIG. 3, it will be seen that a bore 26 is formed in a flange 28 which extends generally upwardly from the case 14. The exit portion 24 of the filler tube structure 20 is connected to the bore 26 which then communicates with the top portion 16 of the chamber 12.

A dip stick guide tube structure 30 has an interior passage 32 for receiving a dip stick 34. The dip stick guide tube structure 30 has an upper end portion 36 and a lower end portion 38. The upper end portion 36 is positioned adjacent and generally parallel to the input portion 22 of the filler tube structure 20. Generally, the upper end portion 36 of the guide tube structure 30 is positioned generally above the input portion 22 of the filler tube structure 20. In this manner, when fluid is added to the input portion 22 of the filler tube structure 20, it will generally not flow into the upper end portion 36 of the guide tube structure 30.

A tubular fitting 40, having a first end portion 42 and a second end portion 44, has the first end portion 42 thereof circumferentially sealed to the upper end portion 36 of the guide tube structure 30 and to the input portion 22 of the filler tube structure 20. In the particular embodiment illustrated, a wall 46 is formed across the first end portion 42 of the tubular fitting 40, with the wall 46 having a first hole 48 to which the input portion 22 of the filler tube structure 20 is sealingly attached. The wall 46 also has a second hole 50 to which the upper end portion 36 of the guide tube structure 30 is sealingly attached.

The dip stick 34, as previously mentioned, is adapted to fit in the interior passage 32 of the guide tube structure 30. The dip stick 34 has a lower end 54 and an upper end 56, and a handle 52 is attached adjacent to the upper end 56 and is of a size and construction to fit within the tubular fitting 40. A cap 58, normally of a conventional variety and having conventional pressure release threads to allow release of internal pressure prior to removal and to thereby prevent splattering out of fluid, is removably attachable in a covering, generally sealing, relationship with the second end portion 44 of the tubular fitting 40. The handle 52 of the dip stick 34 is also of a size and construction to be free from interference with the cap 58. In this manner, anyone wishing to add fluid to the chamber 12 and removing the cap 58 will immediately find the handle 52 of the dip stick 34.

In accordance with the preferred embodiment of the invention, a venting structure 60, seen best in FIG. 3, serves for venting air which may become entrapped in the chamber 12 on addition of fluid thereto via the filler tube structure 20. Basically, the venting structure 60 includes a venting passage 62 having one end 64 communicating with the top portion 16 of the chamber 12 and having another end 66 communicating with the interior passage 32 at a location external of the case 14.

The vent passage 62 includes a first portion 68 communicating the top portion 16 of the chamber 12 with a block 70 which is attached, for example by bolts 72 (see FIGS. 1 and 2) to the case 14, and more particularly to the flange 28 adjacent the top portion 16 of the chamber 12. The vent passage 62 also has a second portion 74 which communicates the first portion 68 with the interior passage 32 of the guide tube structure 30. Basically, the first portion 68 is a bore in the flange 28 and the second portion 74 is a passage formed in the block 70.

As will be seen in FIG. 3 the guide tube structure 30, in the embodiment illustrated, includes a first tube 76 which includes the upper end portion 36 and a second tube 78 which includes the lower end portion 38, of the guide tube structure 30. The guide tube structure 30 also includes a first passageway 80 through the case 14, and more particularly through the flange 28, and a second passageway 82 through the block 70 with the first and second passageways 80 and 82 connecting the first tube 76 to the second tube 78.

It should be clear that as fluid is flowed into the filler tube structure 20, air can flow via the portions 68 and 74 of the vent passage 62 to the interior passage 32 of the guide tube structure 30. The air can then flow out of the upper end portion 36 of the guide tube structure 30, thereby preventing hydraulic lock by preventing air from becoming entrapped within the chamber 12.

Figure 4:
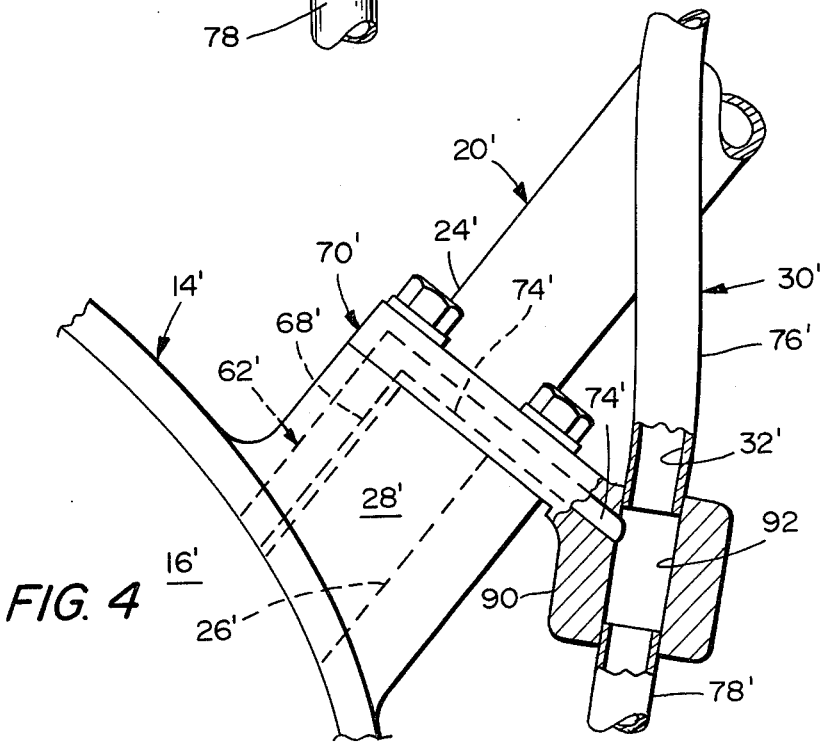
FIG. 4 illustrates, in enlarged view, a portion of an alternate embodiment of the present invention.

Embodiment of FIG. 4

Adverting to FIG. 4, there is illustrated therein an alternate embodiment of the present invention. In the alternate embodiment, wherein primed numbers are used to indicate like or substantially like parts, a block 70' is utilized which is of a somewhat different nature than the block 70 of the embodiment of FIGS. 1-3. The block 70' has a second passage portion 74' which communicates a passage portion 68' with the interior 32' of the guide tube structure 30'. The block 70' has a boss 90 attached thereto and generally integral therewith with the boss 90 having a central bore 92. The guide tube structure 30' is connected to the bore 92 and the second passage portion 74' intersects bore 92 leading to the interior 32'.

The embodiment of FIG. 4 is particularly useful in situations wherein the lower end of the guide tube structure 30' measures the oil level in a pan (not illustrated) which sits below the chamber 12. In such a construction, the dip stick guide tube structure 30' cannot conveniently be directly routed through the transmission case. It should be noted that the upper ends of the filler tube structure 20' and the guide tube structure 30' are arranged just as are the upper ends of the filler tube structure 20 and the dip stick tube structure 30 as shown in FIG. 1. Thus, hydraulic lock, on filling, is prevented.

Industrial Applicability

Apparatus as set out above is particularly useful for adding liquid to a closed transmission system of an earthworking vehicle.

When utilizing an apparatus as set out above, the proper dip stick for checking the fluid level in a chamber is immediately available to servicing personnel.

In accordance with the preferred embodiment of the invention, air venting is provided via the interior of the dip stick guide tube during filling of the enclosed chamber. As a result of the air venting, the chance of hydraulic lock developing is eliminated.

Other aspects, objects and advantages of this invention can be obtained from a study of the drawings, the disclosure and the appended claims.

We claim:

1. An assembly (10) for adding liquid to a closed interior chamber (12) defined by a case (14), the chamber (12) having top (16) and bottom (18) portions, comprising:
    a filler tube structure (20) having input (22) and exit (24) portions, the exit portion (24) being in communication with the top portion (16) and the input portion (22) being generally above the exit portion (24);
    a dip stick tube structure (30) having an interior passage (32) and having upper (36) and lower (38) end portions, the upper end portion (36) being positioned adjacent and generally parallel to the input portion (22);
    a tubular fitting (40) having first (42) and second (44) end portions, the first end portion (42) being circumferentially sealed to the upper end portion (36) and to the input portion (22); and
    a cap (58) removably attachable in a sealed covering relationship with the second end portion (44).

2. The assembly (10) as set forth in claim 1, further including:
    a venting structure (60) having a vent passage (62) having one end (64) communicating with said top portion (16) and another end (66) communicating with said interior passage (32) external of said case (14).

3. The assembly as set forth in claim 1, further including:
    a dip stick (34) adapted to fit in said interior passage (32), having lower (54) and upper (56) ends and having a handle (52) attached adjacent said upper end (56), said handle (52) being of a size and construction to fit within said fitting (40) and being free from interference with said cap (58).

4. The assembly (10) as set forth in claim 1, wherein said upper end portion (36) is located generally above said input portion (22).

5. The assembly (10) as set forth in claim 2, further including:
    a block (70,70') attached to said case (14,14') opposite said top portion (16,16') and having a fill passage (26,26') communicating said top portion (16,16') with said filler tube structure (20,20'); and
    wherein said vent passage (62,62') includes a first portion (68,68') communicating said top portion (16,16') with said block (70,70') and a second portion (74,74') communicating said first portion (68,68') with said interior passage (32,32').

6. The assembly (10) as set forth in claim 5, wherein said dip stick tube structure (30) includes a first tube (76) which includes said upper end portion (36) and a second tube (78) which includes said lower end portion (38), a first passageway (80) through said case (14) and a second passageway (82) through said block (70), said first (80) and second (82) passageways connecting said first tube (76) to said second tube (78).

7. The assembly (10) as set forth in claim 5, further including:
- a boss (90) attached to said block (70') and having a central bore (92);
- wherein said dip stick tube structure (30') is connected to said bore (92); and
- wherein said second portion (74') passes through said boss (90) and communicates with said bore (92).

* * * * *